US011323620B2

United States Patent
Yuan

(10) Patent No.: US 11,323,620 B2
(45) Date of Patent: May 3, 2022

(54) WEARABLE CAMERA AND A METHOD FOR POWER CONSUMPTION OPTIMIZATION IN THE WEARABLE CAMERA

(71) Applicant: Axis AB, Lund (SE)

(72) Inventor: Song Yuan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/191,157

(22) Filed: Mar. 3, 2021

(65) Prior Publication Data
US 2021/0297602 A1  Sep. 23, 2021

(30) Foreign Application Priority Data
Mar. 17, 2020 (EP) .................................... 20163551

(51) Int. Cl.
*H04N 5/232* (2006.01)
*H04N 5/77* (2006.01)
(Continued)

(52) U.S. Cl.
CPC ... *H04N 5/232411* (2018.08); *H04N 5/23258* (2013.01); *H04N 5/23264* (2013.01);
(Continued)

(58) Field of Classification Search
CPC ......... H04N 5/232411; H04N 5/23258; H04N 5/23264; H04N 5/772; H04N 7/06; H04N 17/002; H04N 5/23248; H04N 19/115; H04N 19/156; H04N 19/184; H04N 5/23241; H04N 5/23218; H04N 5/23245; H04N 5/915; H04N 7/0127; G02B 27/646
See application file for complete search history.

(56) References Cited

U.S. PATENT DOCUMENTS

2006/0121955 A1   6/2006   Shlomot
2007/0076982 A1   4/2007   Petrescu
(Continued)

FOREIGN PATENT DOCUMENTS

CN    110266950 A    9/2019
JP    2000-284336 A   10/2000

OTHER PUBLICATIONS

Extended European Search Report dated Jul. 28, 2020 for European Patent Application No. 20163551.3.
(Continued)

*Primary Examiner* — Gevell V Selby
(74) *Attorney, Agent, or Firm* — Volpe Koenig

(57) ABSTRACT

A method for power consumption optimization in a wearable camera comprises: monitoring a bitrate of a video stream captured by the wearable camera. Upon the bitrate being above a first bitrate threshold, activating a movement sensor of the wearable camera. Upon activation of the movement sensor, analyzing whether activation of the movement sensor is beneficial for reducing the bitrate. In case activation of the movement sensor is beneficial for reducing the bitrate, keeping the movement sensor active and performing image stabilization based on movement data from the movement sensor, otherwise, deactivating the movement sensor. Also, a wearable camera is presented.

15 Claims, 2 Drawing Sheets

(51) Int. Cl.
*H04N 7/06* (2006.01)
*H04N 17/00* (2006.01)

(52) U.S. Cl.
CPC ............... *H04N 5/772* (2013.01); *H04N 7/06* (2013.01); *H04N 17/002* (2013.01)

(56) References Cited

U.S. PATENT DOCUMENTS

| | | | |
|---|---|---|---|
| 2010/0245585 A1* | 9/2010 | Fisher | H04N 5/23293 348/240.99 |
| 2018/0227470 A1* | 8/2018 | Rönngren | H04N 5/2628 |
| 2020/0344442 A1* | 10/2020 | Gandhi | H04N 5/915 |

OTHER PUBLICATIONS

Huang et al., "Encoding Shaky Videos by Integrating Efficient Video Stabilization," in IEEE Transactions on Circuits and Systems for Video Technology, vol. 29, No. 5, pp. 1503-1514, (May 2019).
Engelsberg et al., "A comparative review of digital image stabilising algorithms for mobile video communications," pp. 591-597 (1999).

* cited by examiner

… … …

WEARABLE CAMERA AND A METHOD FOR POWER CONSUMPTION OPTIMIZATION IN THE WEARABLE CAMERA

TECHNICAL FIELD

The present invention relates to power consumption optimization in a wearable camera.

BACKGROUND

Wearable cameras are used, e.g., by police officers, for capturing video and other data during patrols and incidents. Such cameras may also be referred to as body worn cameras, BWCs. Wearable cameras are typically battery powered. Hence, there are limitations in power available for a wearable camera. Accordingly, optimization of power consumption in a wearable camera is desired.

SUMMARY

Facilitating battery power savings in a wearable camera, and achieving bitrate savings for a video stream generated by the wearable camera would be beneficial.

According to a first aspect a method for power consumption optimization in a wearable camera is provided. The method comprises monitoring a bitrate of a video stream captured by the wearable camera; upon the bitrate being above a first bitrate threshold, activating a movement sensor of the wearable camera; upon activation of the movement sensor, analyzing whether activation of the movement sensor is beneficial for reducing the bitrate; and in case activation of the movement sensor is beneficial for reducing the bitrate, keeping the movement sensor active and performing image stabilization based on movement data from the movement sensor, otherwise, deactivating the movement sensor.

By only have the movement sensor of the wearable camera in active mode when movement data measured by the movement sensor is needed for other functions of the wearable camera, such as image stabilization, power consumption in the wearable camera may be saved. Hence, operation time of the wearable camera may be prolonged. Also, optimization of power consumption in relation to bitrate of the video stream may be provided. This since, battery power may be used in a bitrate optimized manner. In case of bitrate savings being available in case of having the movement sensor active the movement sensor may be kept active for providing movement data to perform bitrate saving image stabilization.

The method may further comprise activating an image stabilization of the video stream based on movement data from the movement sensor. Analyzing whether activation of the movement sensor is beneficial for reducing the bitrate may comprise analyzing the bitrate of the video stream after image stabilization of the video stream is activated. Activation of the movement sensor may be beneficial for reducing the bitrate in case the bitrate of the video stream after image stabilization of the video stream is lower than a second bitrate threshold. The second threshold may be 90% of the first bitrate threshold. Depending on the scene and pattern of movement, acceptable saving in bitrate due to image stabilization based on movement data can be around 10% to 50%. Hence, in case the image stabilization reduces the bitrate of the video stream by more than 10%, activation of the movement sensor is beneficial, and the movement sensor and the image stabilization should be kept active. Otherwise activation of the movement sensor is not beneficial and power consumption may be saved by deactivating the movement sensor and/or the image stabilization. By keeping the movement sensor and the image stabilization active, optimization of bitrate usage versus battery power usage may be provided. Hence, battery power may be used to reduce the bitrate of the video stream.

The first bitrate threshold may be dependent upon a present state of charge of a battery of the wearable camera. The second bitrate threshold may be dependent upon a present state of charge of a battery of the wearable camera. Hence, the first and/or the second bitrate threshold may dynamically be set so that in case the state of charge of the battery is becoming too low remaining state of charge is not to be spent on activating the movement sensor and possibly also image stabilization.

The first bitrate threshold may be dependent upon available storage space in a local data storage of the wearable camera. The second bitrate threshold may be dependent upon available storage space in a local data storage of the wearable camera. Hence, the first and/or second bitrate threshold may dynamically be set so that in case recording of the video stream has taken unexpected large space, e.g. due to large noise, available storage space may be saved by more easily activating movement data based image stabilization.

Analyzing whether activation of the movement sensor is beneficial for reducing the bitrate may comprise analyzing movement data from the movement sensor. Activation of the movement sensor may be beneficial for reducing the bitrate in case the movement data is indicative of the wearable camera is shaking. The shaking of the wearable camera may be due to that the person wearing it is breathing heavily, e.g. after running. By the wearable camera is shaking is in this context meant that the wearable camera is oscillating. In order for the wearable camera to shake the oscillation is preferably periodic. Further, in order for the wearable camera to shake the oscillation is preferably having an amplitude above a shake threshold. Typically, in case the wearable camera is shaking, activation of image stabilization based on movement data is reducing the bitrate and hence the movement sensor and the image stabilization should be kept active in order to reduce the bitrate. Otherwise activation of the movement sensor is not beneficial and power consumption may be saved by deactivating the movement sensor and/or the image stabilization. By keeping the movement sensor and the image stabilization active optimization of bitrate usage versus battery power usage may be provided. Hence, battery power may be used to reduce the bitrate of the video stream.

Alternatively, or in combination, activation of the movement sensor may be beneficial for reducing the bitrate in case the movement data is indicative of that the wearable camera is located in a same location. By the wearable camera is located in a same location is in this context meant that the wearable camera is not moving in a predominate direction. Movement in a predominate direction may e.g. be that the person wearing the wearable camera is walking or running. By experience of the inventor, in case movement in a predominate direction, image stabilization is not very effective and the movement sensor, and also the image stabilization, may be deactivated in order to save battery power.

The method may comprise keeping the movement sensor and image stabilization of the video stream active for a predetermined time period before performing the step of analyzing whether activation of the movement sensor is beneficial for reducing the bitrate again. Hence, processing power may be saved by not needing to perform the analyzing step so frequently.

The method may comprise keeping the movement sensor and image stabilization of the video stream active until the movement data is indicative of a steady wearable camera. In this context a steady wearable camera in meant that the movement data is indicative of that movement, typically oscillating movement, of the wearable camera is below a threshold. Hence, the wearable camera is not shaking any more. In case of a steady camera the movement sensor and image stabilization may be deactivated since image stabilization will not give any bitrate reduction. Deactivation of the movement sensor and image stabilization will induce battery power savings.

The method may comprise storing the video stream in a local data storage of the wearable camera. The method may comprise wirelessly transmitting the video stream from the wearable camera.

According to a second aspect a non-transitory computer readable recording medium is provided. The non-transitory computer readable recording medium has instructions, possibly in the form of computer readable program code, stored thereon which when executed on a device having processing capability is configured to perform the method of the first aspect. The device having processing capability may be a wearable camera, e.g. a body worn camera or a dashcam.

The above-mentioned features of the method according to the first aspect, when applicable, apply to this second aspect as well. In order to avoid undue repetition, reference is made to the above.

According to a third aspect a wearable camera is provided. The wearable camera comprising: an image sensor configured to capture image data; an encoder configured to encode the image data into a video stream; a movement sensor configured to measure movement data of the wearable camera, wherein the movement sensor is configured to be set in an active mode or an inactive mode; a battery configured to power the wearable camera; and circuitry. The circuitry is configured to execute: a bitrate monitoring function configured to monitor a bitrate of the video stream, an image stabilization function configured to image stabilize the image data based on movement data from the movement sensor, a sensor mode setting function configured to, upon the bitrate being above a first bitrate threshold, set the movement sensor in the active mode, and an analyzing function configured to, upon activation of the movement sensor, analyze whether activation of the movement sensor is beneficial for reducing the bitrate. Wherein the analyzing function is further configured to, in case activation of the movement sensor is beneficial for reducing the bitrate, instruct the sensor mode setting function to keep the movement sensor in the active mode and instruct the image stabilization function to perform image stabilization, otherwise, instruct the sensor mode setting function to set the movement sensor in the inactive mode.

The analyzing function may be configured to analyze whether activation of the movement sensor is beneficial for reducing the bitrate by analyzing the bitrate of the video stream after image stabilization by the image stabilization function. Activation of the movement sensor may be beneficial for reducing the bitrate in case the bitrate of the video stream after image stabilization is lower than a second bitrate threshold. The second threshold may be 90% of the first bitrate threshold.

The analyzing function may be configured to analyze whether activation of the movement sensor is beneficial for reducing the bitrate by analyzing the movement data. Activation of the movement sensor may be beneficial for reducing the bitrate in case the movement data is indicative of that the wearable camera is shaking and/or that the wearable camera is located in a same location.

The wearable camera may further comprise a local data storage configured to store the video stream. The wearable camera may further comprise a transmitter configured to wirelessly transmit the video stream.

Further, the above-mentioned features of the method according to the first aspect, when applicable, apply to this third aspect as well. In order to avoid undue repetition, reference is made to the above.

A further scope of applicability will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that these embodiments are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The embodiments will now be described more fully hereinafter with reference to the accompanying drawings, in which currently preferred embodiments are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
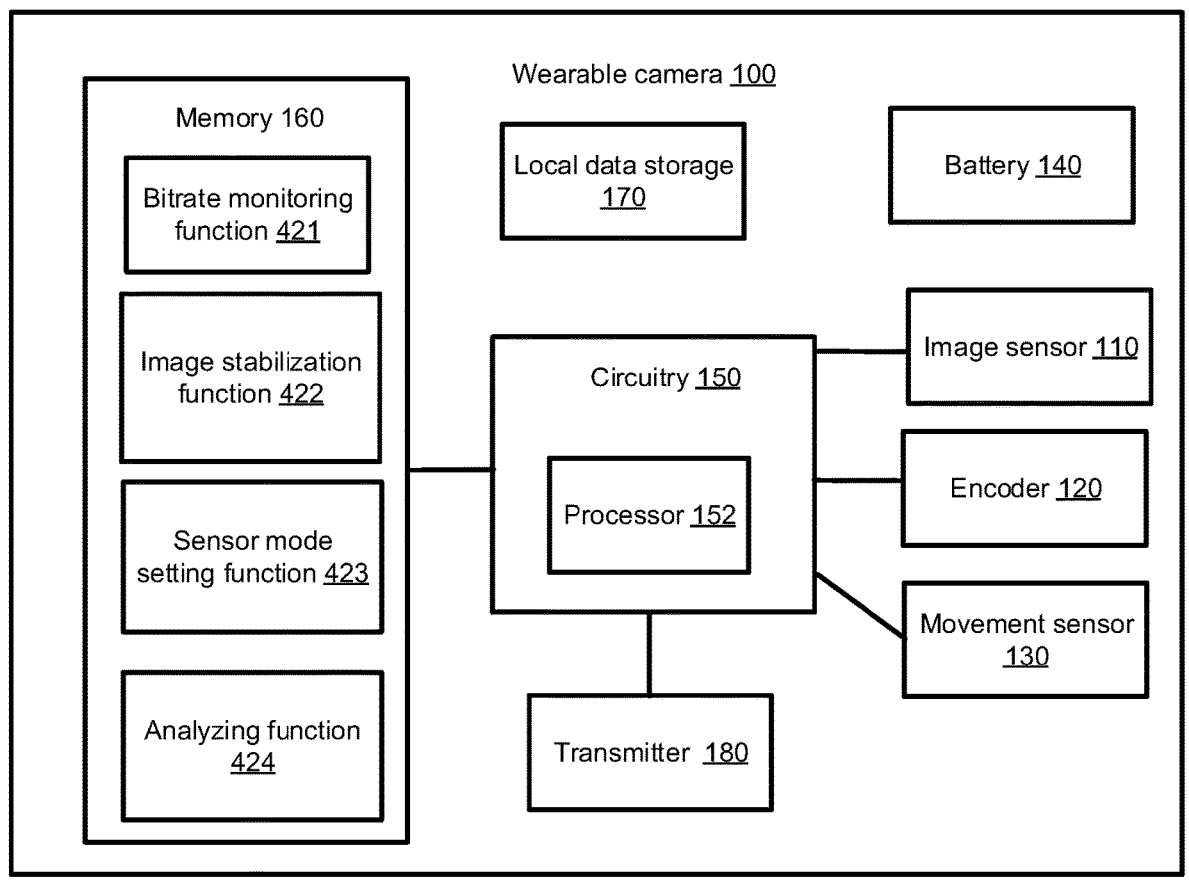
FIG. 1 is a schematic block diagram of a wearable camera.

FIG. 1 illustrates a wearable camera 100. The wearable camera 100 may be a body worn camera, BWC. The wearable camera 100 may be a dashcam. The wearable camera 100 may be used, e.g., by police officers, for capturing video and other possibly other data during patrols and incidents. Captured data may subsequently be needed as evidence, for example when investigating crimes and prosecuting suspected criminals. In order to preserve the captured data, a data management system external from the wearable camera 100, such as a video management system or an evidence management system, may be used. Such data management systems generally provide storage of captured data, and also viewing of the captured data, either in real time or as a playback of recorded data. Typically, the wearable camera 100 is battery powered and has a limited bitrate. The later due to limited local data storage and/or limitations in bandwidth for a wireless connection to the data management system. The wearable camera 100 comprises an image sensor 110, an encoder 120, a movement sensor 130, a battery 140, circuitry 150 and a memory 160.

The battery 140 is configured to power the wearable camera 100 i.e. components of the wearable camera needing power. The battery 140 may be a rechargeable battery.

The image sensor 110 is configured to capture image data. The image data may e.g. be data of image frames. Image sensors and capturing of image data are well known for the person skilled in the art and will not be discussed in any more detail in this disclosure.

The encoder 120 is configured to encode image data captured by the image sensor 110 into a video stream, sometime the video stream provided by the encoder 120 is referred to as an encoded video stream. Typically, the video encoder 120 is configured to encode some of the image frames of the video stream as key frames and some of the image frames of the video stream as delta frames. A key frame is an encoded video frame that does not require information from other encoded video frames to be decoded. Hence, a key frame is encoded based on information from the image frame of video data it is set to correspond to. Typically, similarities within the image frame is used to encode the image frame into a key frame. In video encoding a key frame is also known as an intra frame, often referred to as an I-frame. The image frames of the video stream in between two key frames are encoded as delta frames. Typically, a delta frame only comprises changes that occur from one frame to the next. Hence, delta frames typically comprise less data than key frames. In video encoding a delta frame is also known as an inter frame, often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame.

The wearable camera 100 may further comprise a local data storage 170. The local data storage 170 may be configured to store the video stream. The local data storage typically has a limited data storage capacity. The local data storage 170 may be any type of local data storage suitable for storage of a video stream. For example, the local data storage 170 may be in the form of an SD card reader and an SD card. Another example of a local data storage 170 may be in the form of a flash memory, e.g. a NAND flash.

In order to transfer video data, e.g. the video stream, locally stored on the wearable camera 100 to the data management system, the wearable camera 100 may be configured to be docked to a docking station. Upon being docked in the docketing station, locally stored video data may be transferred from the wearable camera 100 to the data management system. Further, upon being docked in the docketing station, the battery 140 of the wearable camera 100 may be charged.

The wearable camera 100 may further comprise a transmitter 180. The transmitter 180 may be configured to wirelessly transmit the video stream to the data management system. The transmitter 180 may be configured to continuously transfer the captured video stream to the video management system. The wireless transfer is typically limited due to bandwidth available for the wireless transfer.

The movement sensor 130 is configured to measure movement data of the wearable device. The movement sensor 130 may comprise a gyroscope and/or an accelerometer. The gyroscope is configured to measure movement data in the form of orientation and/or angular velocity of the wearable camera 100. The accelerometer is configured to measure movement data in the form of acceleration (or rate of change of velocity) of the wearable camera 100 in its own instantaneous rest frame. The movement sensor 130 is configured to sample the movement data as a function of time. Movement sensor 130 may be set in either an active mode or in an inactive mode. Hence, at a specific moment in time the movement sensor 130 is active or inactive. In the active mode, the movement sensor 130 measures the movement data. In the active mode, the movement sensor 130 consumes power from the battery 140. In the inactive mode, the movement sensor 130 does not measure the movement data. In the inactive mode, the movement sensor 130 consumes no or very limited power from the battery 140. Hence, in the active mode the movement sensor 130 consumes considerably more power from the battery 140 than in the inactive mode.

The circuitry 150 is configured to carry out overall functions of the wearable camera 100. The circuitry 150 may include a processor 152, such as a central processing unit (CPU), microcontroller, or microprocessor. The processor 152 is configured to execute program code stored in the memory 160, in order to carry out functions of the wearable camera 100.

The memory 160 may be one or more of a buffer, a flash memory, a hard drive, a removable media, a volatile memory, a non-volatile memory, a random access memory (RAM), or another suitable device. In a typical arrangement, the memory 160 may include a non-volatile memory for long term data storage and a volatile memory that functions as system memory for the circuitry 150. The memory 160 may exchange data with the circuitry 150 over a data bus. Accompanying control lines and an address bus between the memory 160 and the circuitry 150 also may be present.

Functions of the wearable camera 100 may be embodied in the form of executable logic routines (e.g., lines of code, software programs, etc.) that are stored on a non-transitory computer readable medium (e.g., the memory 160) of the wearable camera 100 and are executed by the circuitry 150 (e.g., using the processor 152). Furthermore, the functions of the wearable camera 100 may be a stand-alone software application or form a part of a software application that carries out additional tasks related to the wearable camera 100. The described functions may be considered a method that a processing unit, e.g. the processor 152 of the circuitry 150 is configured to carry out. Also, while the described functions may be implemented in software, such functionality may as well be carried out via dedicated hardware or firmware, or some combination of hardware, firmware and/or software.

The circuitry 150 may be configured to execute a bitrate monitoring function 421. The bitrate monitoring function 421 is configured to monitor a bitrate of the video stream encoded by the encoder 120.

The circuitry 150 may be configured to execute an image stabilization function 422. The image stabilization function 422 is configured to image stabilize video data captured by the wearable camera 100 based on movement data from the movement sensor 130 being in active mode. Hence, the image stabilization function 422 is dependent upon movement data from the movement sensor 130 as input data for performing the image stabilization. The image stabilization function 422 may be set in an active mode or in an inactive mode. Hence, at a specific moment in time the image stabilization function 422 is active or inactive. In the active mode, the image stabilization function 422 performs image stabilization of video data captured by the wearable camera 100. In the active mode, the image stabilization function 422s consumes power from the battery 140. In the inactive mode, the image stabilization function 422 does not perform image stabilization of video data captured by the wearable camera 100. In the inactive mode, the image stabilization function 422 consumes no or very limited power from the battery 140. Hence, in the active mode the image stabilization function 422 consumes considerably more power from the battery than in the inactive mode.

The circuitry 150 may be configured to execute a sensor mode setting function 423. The sensor mode setting function 423 is configured to set the movement sensor 130 in the active mode or in the inactive mode. Especially, the sensor mode setting function 423 may be configured to, upon the bitrate being above a first bitrate threshold, set the movement sensor 130 in the active mode. The first bitrate threshold may be a preset threshold. The first bitrate threshold may be dependent upon a present state of charge of the battery 140 of the wearable camera 100. Hence, the first bitrate threshold may dynamically be set so that in case the state of charge of the battery 140 becomes too low remaining state of charge is not to be spent on activating the movement sensor 130 and possibly also image stabilization. Alternatively, the first bitrate threshold may be dependent upon available storage space in the local data storage 170. Hence, the first bitrate threshold may dynamically be set so that in case recording of the video stream has taken unexpected large space, e.g. due to large noise, available storage space may be saved by more easily activating movement data based image stabilization.

The circuitry 150 may be configured to execute an analyzing function 424. The analyzing function 424 is configured to analyze whether activation of the movement sensor 130 is beneficial for reducing the bitrate. Hence, the analyzing function 424 is configured to be performed upon activation of the movement sensor 130. The analyzing function 424 may be configured to analyze whether activation of the movement sensor 130 is beneficial for reducing the bitrate in various ways.

The analyzing function 424 may be configured to analyze whether activation of the movement sensor 130 is beneficial for reducing the bitrate by analyzing the bitrate of the video stream after image stabilization by the image stabilization function 422 is performed. Hence, analyzing the bitrate of the video stream after image stabilization by the image stabilization function 422 is activated. Activation of the movement sensor 130 may be beneficial for reducing the bitrate in case the bitrate of the video stream after image stabilization of the video stream is lower than a second bitrate threshold. The second threshold may be ≤90% of the first bitrate threshold. Depending on the scene and pattern of movement, acceptable saving in bitrate due to image stabilization based on movement data can be around 10% to 50%. Hence, in case the image stabilization by the image stabilization function 422 reduces the bitrate of the video stream by more than 10% activation of the movement sensor 130 is beneficial and the movement sensor 130 and the image stabilization function 422 should be kept active. Otherwise activation of the movement sensor 130 is not beneficial and power consumption may be saved by deactivating the movement sensor 130 and/or the image stabilization function 422.

Alternatively, or in combination, the analyzing function 424 may be configured to analyze whether activation of the movement sensor 130 is beneficial for reducing the bitrate by analyzing the movement data. Activation of the movement sensor 130 may be beneficial for reducing the bitrate in case the movement data is indicative that the wearable camera 100 is shaking. The shaking of the wearable camera 100 may be due to the person wearing it breathing heavily, e.g. after running. By the wearable camera 100 is shaking is in this context meant that the wearable camera 100 is oscillating. In order for the wearable camera 100 to shake, the oscillation is preferably periodic. Further, in order for the wearable camera 100 to shake the oscillation preferably has an amplitude above a shake threshold. Typically, in case the wearable camera 100 is shaking, activation of image stabilization based on movement data reduces the bitrate and hence the movement sensor 130 and the image stabilization function 422 should be kept active in order to reduce the bitrate. Otherwise activation of the movement sensor 130 is not beneficial and power consumption may be saved by deactivating the movement sensor 130 and/or the image stabilization function 422.

Alternatively, or in combination, the analyzing function 424 may be configured to analyze whether activation of the movement sensor 130 is beneficial for reducing the bitrate by analyzing the movement data. Activation of the movement sensor 130 may be beneficial for reducing the bitrate in case the movement data is indicative that the wearable camera 100 is located in a same location. By the wearable camera 100 being located in a same location is in this context meant that the wearable camera 100 is not moving in a predominate direction. Movement in a predominate direction may e.g. be that the person wearing the wearable camera 100 is walking or running. By experience of the inventor, in case movement in a predominate direction, image stabilization is not very effective and the movement sensor 130, and also the image stabilization function 422, may be deactivated in order to save battery power.

The analyzing function 424 may further be configured to, in case activation of the movement sensor 130 is beneficial for reducing the bitrate, instruct the sensor mode setting function 423 to keep the movement sensor 130, and typically also the image stabilization function 422, active. Otherwise the analyzing function 424 may be configured to, instruct the sensor mode setting function 423 to set the movement sensor 130, and typically also the image stabilization function 422, in the inactive mode. The analyzing function 424 may actively instruct the sensor mode setting function 423 to keep the movement sensor 130, and typically also the image stabilization function 422, active. Alternatively, the analyzing function 424 may inactively instruct the sensor mode setting function 423 to keep the movement sensor 130, and typically also the image stabilization function 422, active, i.e. the instructions to keep the movement sensor 130, and typically also the image stabilization function 422, active may be in the form of that no instruction is sent to the sensor mode setting function 423. Hence, the movement sensor 130, and typically also the image stabilization function 422, will be in the active mode until the sensor mode setting function 423 is told otherwise.

The analyzing function 424 may be configured to keep the movement sensor 130, and typically also the image stabilization function 422, active for a predetermined time period before performing a new analysis, whether activation of the movement sensor 130 is beneficial for reducing the bitrate. The time period may be in the order of minutes. Alternatively, or in combination, the analyzing function 424 may be configured to keep the movement sensor 130, and typically also the image stabilization function 422, active until the movement data is indicative of a steady wearable camera 100. In this context a steady wearable camera 100 in meant that the movement data is indicative of that movement, typically oscillating movement, of the wearable camera 100 is below a threshold.

Figure 2:
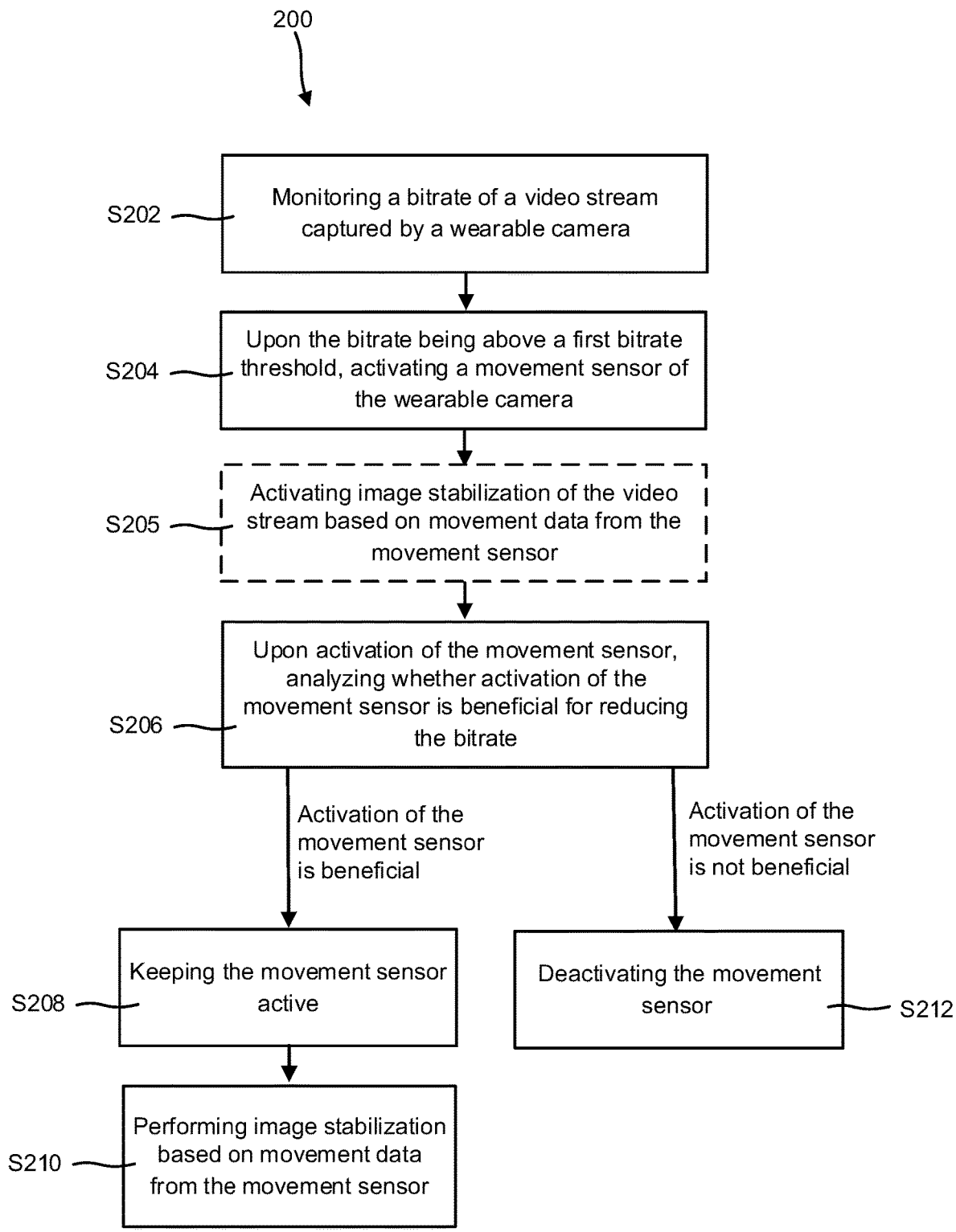
FIG. 2 is a block scheme of a method for power consumption optimization in a wearable camera.

In connection with FIG. 2 a method 200 for power consumption optimization in a wearable camera 100 will be discussed. The method 200 is based on the insight made by the inventor that by only have the movement sensor 130 of the wearable camera 100 in active mode when movement data measured by the movement sensor 130 is needed for other functions of the wearable camera 100, such as image stabilization, power consumption in a wearable camera 100 may be saved. Hence, the present method may save on power consumption and hence possible also on battery life time at the wearable camera 100. This may be performed at the same time as bitrate optimization may be performed. This since, the method allows for usage of movement data from the movement sensor 130 upon bitrate in the video stream captured by the wearable camera 100 may be reduced. Hence, usage of storage space in the local data storage 170 and/or usage of bandwidth used for transmitting the captured video stream may be optimized.

Some or all the steps of the method 200 may be performed by the functions of the wearable camera 100 described above. The method comprises the flowing steps. The steps may be performed in any suitable order.

Monitoring S202 a bitrate of a video stream captured by the wearable camera 100. Upon the bitrate being above the first bitrate threshold, activating S204 the movement sensor 130 of the wearable camera 100. Upon activation of the movement sensor 130, analyzing S206 whether activation of the movement sensor 130 is beneficial for reducing the bitrate. In case activation of the movement sensor 130 is beneficial for reducing the bitrate, keeping S208 the movement sensor 130 active and performing S210 image stabilization based on movement data from the movement sensor 130, otherwise, deactivating S212 the movement sensor 130.

The method may comprise activating S205 image stabilization of the video stream based on movement data from the movement sensor 130. In case this step is performed the step of performing S210 image stabilization based on movement data from the movement sensor 130 may be said to be keeping the image stabilization based on movement data from the movement sensor 130 active.

The step of analyzing S206 whether activation of the movement sensor 130 is beneficial for reducing the bitrate may comprise analyzing the bitrate of the video stream after image stabilization of the video stream is activated. In such case, activation of the movement sensor 130 is beneficial for reducing the bitrate in case the bitrate of the video stream after image stabilization of the video stream is lower than the second bitrate threshold. As mentioned above the second threshold is preferably ≤90% of the first bitrate threshold. Further, as also mentioned above, the first bitrate threshold and/or the second bitrate threshold may be dependent upon a present state of charge of the battery 140 of the wearable camera 100. Moreover, as also mentioned above, the first bitrate threshold and/or the second bitrate threshold may be dependent upon available storage space in the local data storage 170 of the wearable camera 100.

The step of analyzing S206 whether activation of the movement sensor 130 is beneficial for reducing the bitrate may comprise analyzing movement data from the movement sensor 130. In such case activation of the movement sensor 130 may be beneficial for reducing the bitrate in case the movement data is indicative of the wearable camera 100 is shaking, shaking of the wearable camera 100 is discussed above in connection with the analyzing function 424. Further, in such case activation of the movement sensor 130 may be beneficial for reducing the bitrate in case the movement data is indicative of that the wearable camera 100 is located in a same location, location of the wearable camera 100 is a same location is discussed above in connection with the analyzing function 424.

The method may further comprise keeping the movement sensor 130 and image stabilization of the video stream active for a predetermined time period before performing the step of analyzing S206 whether activation of the movement sensor 130 is beneficial for reducing the bitrate again.

The method may further comprise keeping the movement sensor 130 and image stabilization of the video stream active until the movement data is indicative of a steady wearable camera 100. Steadiness of the wearable camera is discussed above.

The method may further comprise storing the video stream in a local data storage 170 of the wearable camera 100. The method may further comprise wirelessly transmitting the video stream from the wearable camera 100.

A person skilled in the art would that the teachings herein are by no means limited to the preferred embodiments described above. On the contrary, many modifications and variations are possible within the scope of the appended claims.

For example, the wearable camera 100 may be used by a police officer. On patrols, the police officer may use the wearable camera 100 for continuous recording. However, continuous recording requires high capacity of the local data storage 170, and most of the time the captured data will not be of much interest. Therefore, it is usually preferable to record only on demand. To this end, the wearable camera 100 may comprise an activation button, which the police officer can easily activate and deactivate when desired.

Further, the wearable camera 100 may comprise a video buffer. The video buffer being configured to buffer video data. Upon activation of recording by the wearable camera 100 the video data in the video buffer may be added to the video stream. By doing so, events taking place prior to the activation may be recorded as part of the video stream. The video buffer may be configured to buffer video data for a period of time up to one or a few minutes before activation of recording by the wearable camera 100. The video data buffered in the video buffer may be stored without image stabilization of the video stream based on movement data has been performed. Hence, the movement sensor 130 does not need to be active until activation of recording by the wearable camera 100. Upon usage of video data from the video buffer, image stabilization on the buffered video data may be made as a post-processing using features depicted in the video stream.

Additionally, variations to the disclosed embodiments can be understood and effected by the skilled person in practicing the claimed invention, from a study of the drawings, the disclosure, and the appended claims.

The invention claimed is:

1. A method for power consumption optimization in a wearable camera, the method comprising:
   monitoring a bitrate of a video stream captured by the wearable camera;
   upon the bitrate being above a first bitrate threshold, activating a movement sensor of the wearable camera and activating an image stabilization of the video stream based on movement data from the movement sensor;
   upon activation of the movement sensor and the image stabilization, analyzing whether activation of the movement sensor and the image stabilization is beneficial for reducing the bitrate; and
   in case activation of the movement sensor and the image stabilization is beneficial for reducing the bitrate, keeping the movement sensor active and performing image stabilization based on movement data from the movement sensor, otherwise, deactivating the movement sensor.

2. The method according to claim 1, wherein analyzing whether activation of the movement sensor and the image stabilization is beneficial for reducing the bitrate comprises analyzing the bitrate of the video stream after image stabilization of the video stream is activated, wherein activation of the movement sensor is beneficial for reducing the bitrate in case the bitrate of the video stream after image stabilization of the video stream is lower than a second bitrate threshold, wherein the second threshold is ≤90% of the first bitrate threshold.

3. The method according to claim 1, wherein the first bitrate threshold and/or the second bitrate threshold is dependent upon a present state of charge of a battery of the wearable camera.

4. The method according to claim 1, wherein the first bitrate threshold and/or the second bitrate threshold is dependent upon available storage space in a local data storage of the wearable camera.

5. The method according to claim 1, wherein analyzing whether activation of the movement sensor and the image stabilization is beneficial for reducing the bitrate comprises analyzing movement data from the movement sensor, wherein activation of the movement sensor and the image stabilization is beneficial for reducing the bitrate in case the movement data is indicative of the wearable camera is shaking.

6. The method according to claim 1, wherein analyzing whether activation of the movement sensor and the image stabilization is beneficial for reducing the bitrate comprises analyzing movement data from the movement sensor, wherein activation of the movement sensor and the image stabilization is beneficial for reducing the bitrate in case the movement data is indicative of that the wearable camera is located in a same location.

7. The method according to claim 1, further comprising keeping the movement sensor and image stabilization of the video stream active for a predetermined time period before performing the step of analyzing whether activation of the movement sensor and the image stabilization is beneficial for reducing the bitrate again.

8. The method according to claim 1, further comprising keeping the movement sensor and image stabilization of the video stream active until the movement data is indicative of a steady wearable camera.

9. The method according to claim 1, further comprising storing the video stream in a local data storage of the wearable camera and/or wirelessly transmitting the video stream from the wearable camera.

10. A non-transitory computer-readable storage medium having stored thereon instructions for implementing a method for power consumption optimization in a wearable camera, when executed on a device having processing capabilities, the method comprising:
    monitoring a bitrate of a video stream captured by the wearable camera;
    upon the bitrate being above a first bitrate threshold, activating a movement sensor of the wearable camera and activating an image stabilization of the video stream based on movement data from the movement sensor;
    upon activation of the movement sensor and the image stabilization, analyzing whether activation of the movement sensor and the image stabilization is beneficial for reducing the bitrate; and
    in case activation of the movement sensor and the image stabilization is beneficial for reducing the bitrate, keeping the movement sensor active and performing image stabilization based on movement data from the movement sensor, otherwise, deactivating the movement sensor.

11. A wearable camera comprising:
    an image sensor configured to capture image data;
    an encoder configured to encode the image data into a video stream;
    a movement sensor configured to measure movement data of the wearable camera, wherein the movement sensor is configured to be set in an active mode or an inactive mode;
    a battery configured to power the wearable camera; and
    circuitry configured to execute:
        a bitrate monitoring function configured to monitor a bitrate of the video stream,
        an image stabilization function configured to image stabilize the image data based on movement data from the movement sensor,
        a sensor mode setting function configured to, upon the bitrate being above a first bitrate threshold, set the movement sensor in the active mode, and
        an analyzing function configured to, upon activation of the movement sensor and the image stabilization, analyze whether activation of the movement sensor and the image stabilization is beneficial for reducing the bitrate,
        wherein the analyzing function is further configured to, in case activation of the movement sensor and the image stabilization is beneficial for reducing the bitrate, instruct the sensor mode setting function to keep the movement sensor in the active mode and instruct the image stabilization function to perform image stabilization, otherwise, instruct the sensor mode setting function to set the movement sensor in the inactive mode.

12. The wearable camera according to claim 11, wherein the analyzing function is configured to analyze whether activation of the movement sensor and the image stabilization is beneficial for reducing the bitrate by analyzing the bitrate of the video stream after image stabilization by the image stabilization function, wherein activation of the movement sensor and the image stabilization is beneficial for reducing the bitrate in case the bitrate of the video stream after image stabilization is lower than a second bitrate threshold, wherein the second threshold is ≤90% of the first bitrate threshold.

13. The wearable camera according to claim 11, wherein the analyzing function is configured to analyze whether activation of the movement sensor and the image stabilization is beneficial for reducing the bitrate by analyzing the movement data, wherein activation of the movement sensor and the image stabilization is beneficial for reducing the bitrate in case the movement data is indicative of that the wearable camera is shaking and/or that the wearable camera is located in a same location.

14. The wearable camera according to claim 11, wherein the first bitrate threshold and/or the second bitrate threshold is dependent upon a present state of charge of a battery of the wearable camera and/or available storage space in a local data storage of the wearable camera.

15. The wearable camera according to claim 11, further comprising a local data storage configured to store the video stream and/or a transmitter configured to wirelessly transmit the video stream.

\* \* \* \* \*